United States Patent
Metternich et al.

(10) Patent No.: US 7,648,153 B2
(45) Date of Patent: Jan. 19, 2010

(54) CONTROL DEVICE FOR A TRACTOR PROVIDED WITH A SYSTEM FOR DETECTING PIVOTING AND ARTICULATING ANGLES BETWEEN SAID TRACTOR AND A TRAILER

(75) Inventors: Heinz-Rüdiger Metternich, Hamburg (DE); Karsten Lüders, Seevetal (DE)

(73) Assignee: Georg Fischer Verkehrstechnik GmbH, Singen (DE)

( * ) Notice: Subject to any disclaimer, the term of this patent is extended or adjusted under 35 U.S.C. 154(b) by 512 days.

(21) Appl. No.: 10/562,636

(22) PCT Filed: Apr. 27, 2004

(86) PCT No.: PCT/EP2004/004410
§ 371 (c)(1),
(2), (4) Date: Feb. 28, 2006

(87) PCT Pub. No.: WO2004/096623
PCT Pub. Date: Nov. 11, 2004

(65) Prior Publication Data
US 2006/0145450 A1    Jul. 6, 2006

(30) Foreign Application Priority Data
May 2, 2003    (DE)    ............... 203 06 787 U

(51) Int. Cl.
*B60D 1/24*    (2006.01)
*B62D 53/08*    (2006.01)
*G01B 7/30*    (2006.01)
(52) U.S. Cl. ............. 280/433; 280/511; 324/207.25
(58) Field of Classification Search ............ 280/426, 280/432, 433, 446.1, 511; 324/207.2, 207.25
See application file for complete search history.

(56) References Cited

U.S. PATENT DOCUMENTS

| | | | | |
|---|---|---|---|---|
| 3,833,928 A * | 9/1974 | Gavit et al. | ................. | 340/431 |
| 3,947,839 A * | 3/1976 | Zigmant | .................... | 340/431 |
| 4,620,717 A * | 11/1986 | Ivony et al. | ................. | 280/432 |
| 4,763,916 A * | 8/1988 | Ratsko et al. | ............... | 280/432 |
| 5,152,544 A * | 10/1992 | Dierker et al. | ............. | 280/432 |

(Continued)

FOREIGN PATENT DOCUMENTS

DE    199 64 045    7/2001

(Continued)

*Primary Examiner*—Anne Marie M. Boehler
(74) *Attorney, Agent, or Firm*—Merek, Blackmon & Voorhees, LLC

(57) ABSTRACT

A control device for an articulated road train provided with a system for detecting pivoting and articulating angles between the central longitudinal axes of the tractor and a semi-trailer coupled thereto by a coupling pin during coupling and parking and/or a control device for an articulated road train provided with a system for detecting pivoting and articulating angles between the central longitudinal axes of a drawbar and a trailer which is coupled by the drawbar during coupling and parking. The system has a plurality of Hall sensors (21) arranged side-by-side on the arc of a circle and a constant magnet (30) interacting therewith in such a way that it acts on the nearest Hall sensor according to the radial position thereof, a required angle ($\alpha$) being determined on the basis of the excited Hall sensor position.

4 Claims, 2 Drawing Sheets

U.S. PATENT DOCUMENTS

Figure 3:
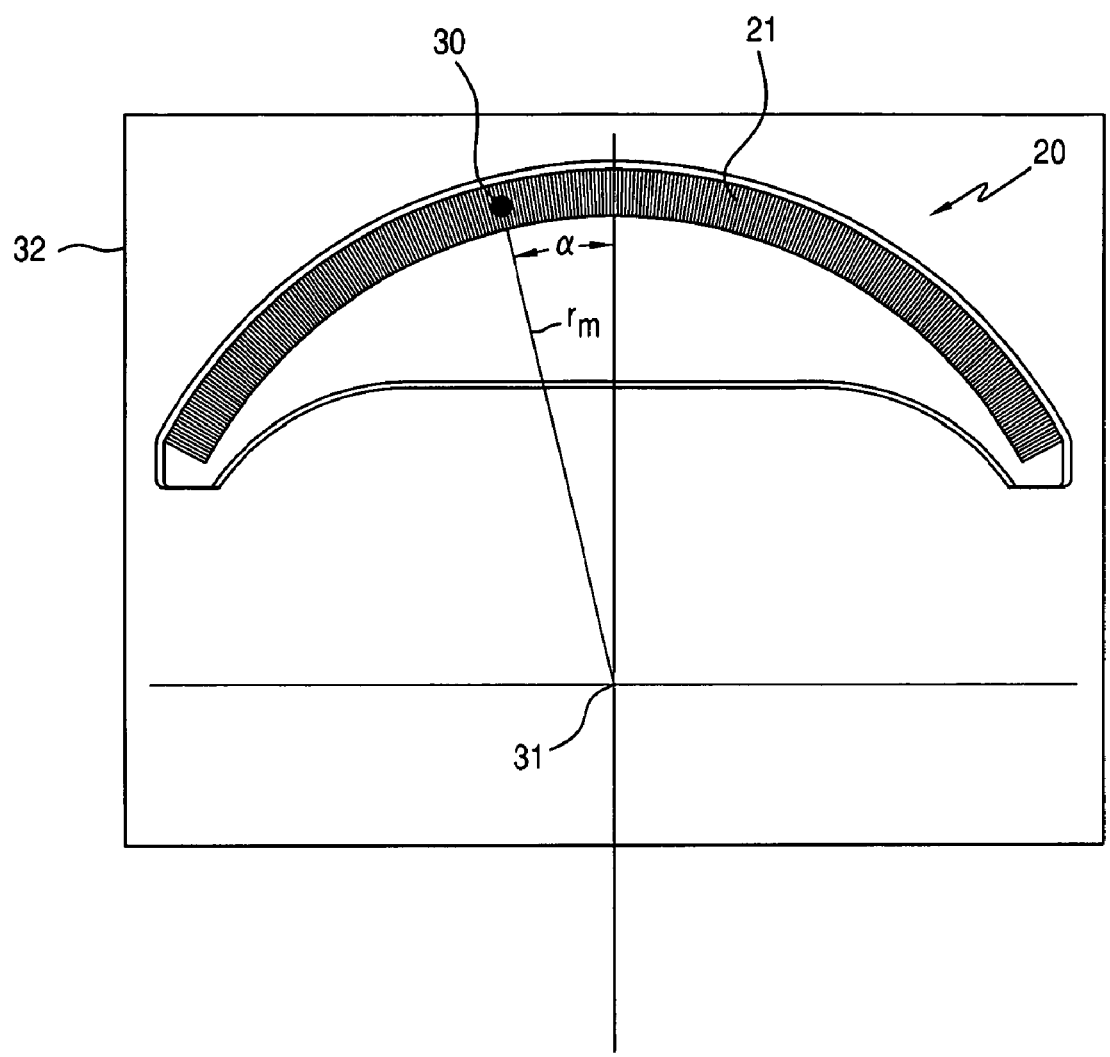

| | | | |
|---|---|---|---|
| 5,558,350 A * | 9/1996 | Kimbrough et al. | 280/426 |
| 5,630,604 A * | 5/1997 | Ducote | 280/426 |
| 6,879,240 B2 * | 4/2005 | Kruse | 338/12 |
| 6,956,468 B2 * | 10/2005 | Lee et al. | 340/431 |
| 2004/0021459 A1 * | 2/2004 | Jones et al. | 324/207.25 |
| 2005/0121921 A1 * | 6/2005 | Alguera et al. | 292/201 |
| 2005/0237054 A1 * | 10/2005 | Halder et al. | 324/207.21 |
| 2006/0071448 A1 * | 4/2006 | Craig et al. | 280/511 |

FOREIGN PATENT DOCUMENTS

| | | | |
|---|---|---|---|
| EP | 000030607 | * | 6/1981 |
| EP | 0 361 166 | | 4/1990 |
| EP | 0 577 571 | | 1/1994 |

* cited by examiner

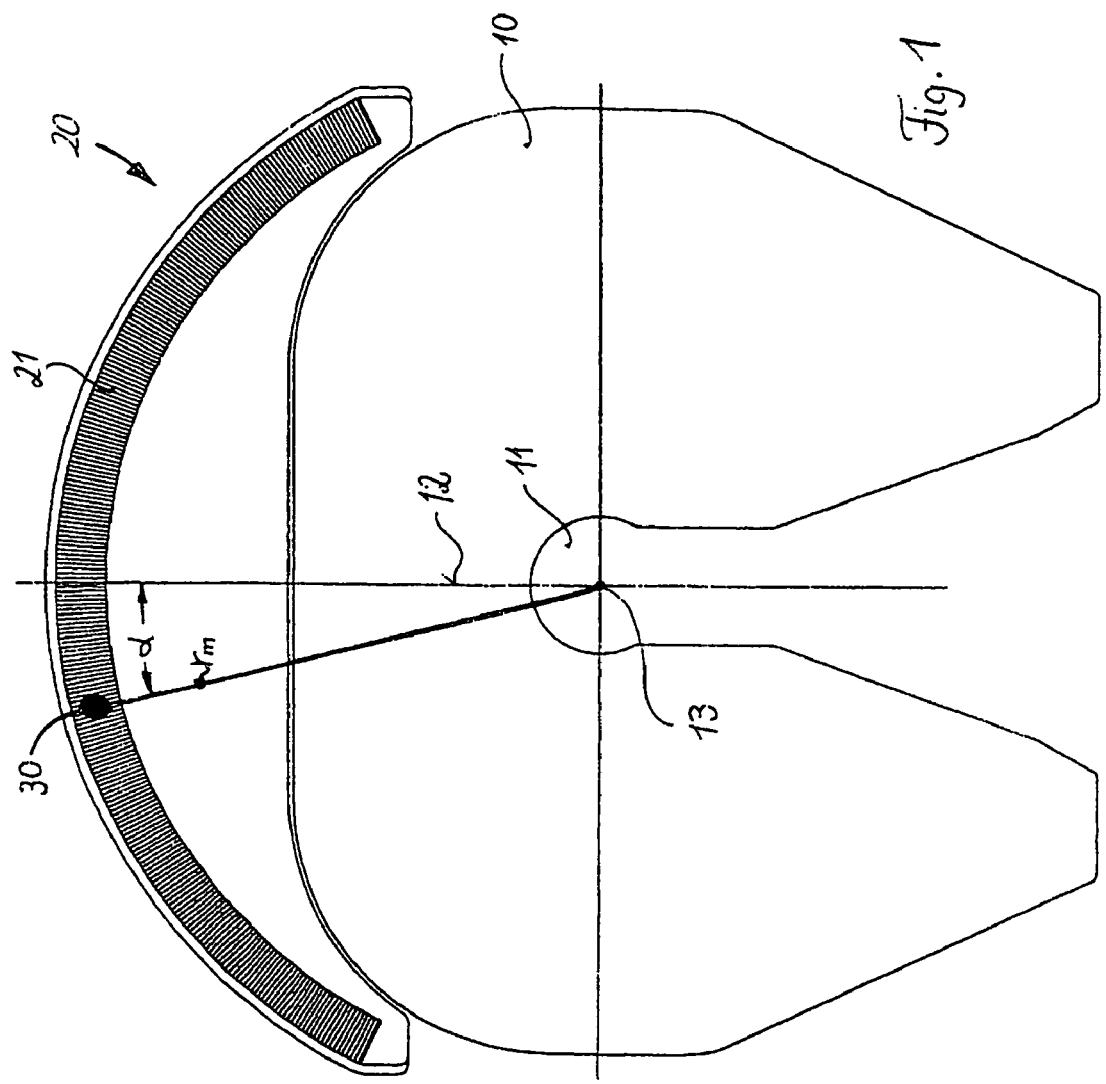
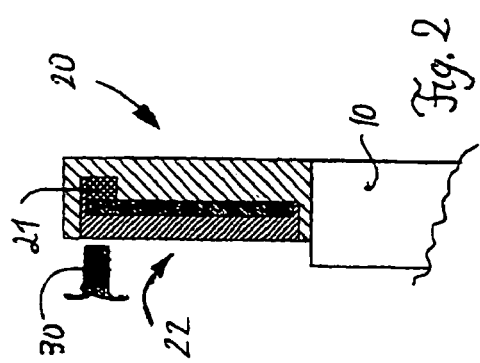

CONTROL DEVICE FOR A TRACTOR PROVIDED WITH A SYSTEM FOR DETECTING PIVOTING AND ARTICULATING ANGLES BETWEEN SAID TRACTOR AND A TRAILER

CROSS-REFERENCE TO RELATED APPLICATIONS

The present application claims the priority under 35 U.S.C. 119 of German Application No. 203 06 787.8, filed May 2, 2003, which is hereby incorporated herein by reference in its entirety.

The invention relates to a control device for a tractor provided with a system for detecting pivoting or articulating angles between the longitudinal geometrical center axes of the tractor and a semitrailer coupled by way of a kingpin when the coupled semitrailer is being coupled and being pulled into and out of parking places.

A device is known for measuring the pivoting angle between a tractor trailer and a semitrailer which is coupled to it (DE 40 21 717 A1). Automatic resetting of the outer rear view mirror of the tractor trailer depending on the pivoting angle by an overtravel control means enables the rear corner of the semi-trailer located on the sides of an inside curve when driving on a curve to remain visible in the pertinent rear view mirror for the driver of a tractor trailer. For this purpose a mechanical rotation angle sensor with a measurement wheel is used.

DE 36 11 469 A1 shows a device for contactless position measurement. Here magnetoresistive elements, that is, electrical resistors, are used which change their value depending on the external magnetic field encountered. These resistors are located on a base and are connected to an evaluation circuit in the form of a bridge circuit. A permanent magnet moves above these resistors, and depending on the position, a corresponding effect is exerted on the resistors. Resistance differences can be recognized in the evaluation circuit so that a conclusion can be drawn about the position of the magnet.

According to DE 199 64 045 A1 there are compasses which respond to terrestrial magnetism on a tractor and a trailer, and a measurement for the angle between the tractor and the trailer will be determined from the difference of the two readings.

PS 33 30 387 C2 is a blocking device for the articulating angle between a tractor and a trailer of an articulated road vehicle. In order to limit this articulating angle, its magnitude must be detected. This takes place using a perforated code disk with light sources on its one side and photocells on its other side.

In DE 199 64 059 A1 the fifth wheel of a tractor is outfitted with a magnetic field sensor. When the kingpin of the trailer is held in the fifth wheel, the permanent magnet is to remain adhering to the freely projecting end of the kingpin. By way of the magnetic field sensor a magnetic field can be measured and in order to determine the articulating angle a series of angular positions must be set and measured beforehand; this opposes use in practice.

This invention is concerned with problems which generally occur when trailers—whether they are loaded with a container or not—are to be coupled to a tractor. Here it must be considered that the trailers are positioned tightly next to each other so that transport without difficulty is only possible when the longitudinal geometrical center axes of the tractor and trailer are flush with each other when coupling and pulling out of the parking place. This is an exceptional case. In practice it must often be considered that the tractor cannot assume this position because in the area in front of the trailer there is not enough room to move the trailer and tractor into this ideal alignment position.

The invention is furthermore concerned with problems which occur when both the coupling process and also the detachment of a trailer are to be carried out automatically, i.e., the tractor is unmanned and is actuated by way of a remote control. An experienced driver can suitably steer his vehicle depending on the angle at which the tractor and trailer are positioned to each other, that is to say, in such a manner as the angle and the ambient conditions permit. Automatic control necessarily requires additional position information in a form in which it can also be used in a data processing unit.

The problems described in the foregoing are to be overcome by this invention; this is achieved by a configuration 20 of a plurality of Hall sensors 21 located next to each other in the area which encloses the receiving opening 11 of the tractor for the fifth-wheel kingpin concentrically on a partial circular arc around the vertical geometrical center axis of the receiving opening, by at least one permanent magnet 30 which is mounted underneath on the semitrailer at a radial distance $r_m$ from the geometrical vertical axis 13 of the kingpin and with a distance to the Hall sensors such that with its magnetic field it acts only on the most closely adjacent Hall sensor of the configuration, and by electrical output lines of the Hall sensors 21, which lines are connected to the evaluation circuit which for its part determines the unknown angle $\alpha$ from the location of the excited Hall sensor.

This first embodiment of the invention involves the coupling of a semitrailer, the kingpin being inserted into the fifth wheel of the tractor trailer.

In the second embodiment of the invention a device of the initially named type is characterized by a configuration of a plurality of Hall sensors located next to each other in the area which concentrically encloses the vertical geometrical pivoting axis of a drawbar, by at least one permanent magnet which is located underneath on the trailer at a radial distance from the vertical geometrical pivoting axis and with a distance to the Hall sensors such that it acts with its magnetic field only on the most closely adjacent Hall sensor of the configuration, and by electrical output lines of the Hall sensors, which lines are connected to the evaluation circuit which for its part determines the unknown angle $\alpha$ from the location of the excited Hall sensor.

In this second embodiment of the invention it is a matter of detecting how the drawbar of a drawbar trailer stands relative to its longitudinal geometrical center axis. To do this, a configuration of Hall sensors is used in a manner similar to that in the first embodiment of the invention. Instead of the vertical center axis of the fifth wheel or the kingpin, here the vertical geometrical axis of the drawbar with reference to the longitudinal geometrical center axis of the trailer is used.

In the third embodiment of the invention the two angles which can be a factor during coupling or decoupling are detected in the corresponding manner. It is a matter of the articulating angle between the horizontal geometrical longitudinal axis of the drawbar of the trailer to the longitudinal geometrical center axis of the tractor and moreover the angle between the drawbar with reference to the longitudinal geometrical center axis of the trailer.

In the operation of unmanned vehicles these two angles are of special importance. Only when these angles are detected can a coupling process and the subsequent starting process be carried out without support by personnel.

A suitable geometrical assignment between the permanent magnet and the Hall sensors can lead to only one specific Hall sensor of a sensor area being excited and delivering a corresponding electronic signal in digital form. By a suitable matrix interconnection of the outputs the corresponding sensor and thus the pertinent angle can be determined at a reference position and can be used as a manipulated variable for the shunting movements of the tractor. These input data are available with sufficiently high geometrical and time resolution so that precise drive control movements can be carried out, particularly when the tractor is being guided by way of a satellite.

The invention is discussed in detail below by way of example with reference to the drawings, in which FIG. 1 shows a top view of the fifth wheel of a tractor trailer in one of the embodiments of the invention.

FIG. 2 on an enlarged scale shows a partial radial section in the plane which passes through the center point of the receiving opening of the fifth wheel and a Hall sensor.

FIG. 3 shows schematically a top view of a drawbar of a trailer in another of the embodiments of the invention.

The figures show the fifth wheel 10 with a receiving opening 11, such as these fifth wheels are currently used in the shipping of containers by means of a tractor trailer and semitrailer.

The receiving opening 11 has a vertical geometrical axis 13. Furthermore the fifth wheel 10 and the receiving opening 11 are made symmetrically to the longitudinal geometrical center axis 12 of the tractor trailer.

The semitrailer itself is not shown, but it is to be seen that the semitrailer is aligned flush to the fifth wheel 10 and thus to the tractor trailer when the two longitudinal geometrical center axes coincide on the line 12 of FIG. 1.

A sensor configuration 20 is shown essentially centrically to the vertical geometrical axis 13. This sensor configuration 20 consists of a plurality of Hall sensors 21 with a middle configuration which coincides with a half circular arc with a radius $r_m$ around the vertical geometrical axis 13.

In FIG. 1 the permanent magnet is designated as 30, and as is to be seen in FIG. 2, is mounted above the configuration 20 of the Hall sensors 21 at a short distance. The magnet 30 is moveably mounted in the lower area of the semitrailer on a circular arc with a radius $r_m$ around the vertical geometrical axis 13. It is centric to the kingpin which is not shown. In the coupled state the vertical geometrical axis of the kingpin coincides with the vertical geometrical axis 13 of the fifth wheel 10.

FIG. 2 is not exactly drawn to scale relative to FIG. 1, but it does shows how the Hall sensors 21 are embedded in a support and are mechanically protected to the outside by a suitable sealing compound 22, the magnetic field of the permanent magnet 30 being able to easily interact with each of the Hall sensors 21.

In FIG. 1 the permanent magnet 30 is shown with an angle α to the longitudinal geometrical center axis 12 of the tractor trailer, i.e., that in the coupled state the longitudinal center axis of the semitrailer deviates from the axis 12 by this angle.

The evaluation circuit which is not shown therefore acquires a signal from the correspondingly excited Hall sensor and said signal in turn corresponds to the adjustment angle α. This angle can now be considered in the starting movements of the tractor trailer.

With the Hall sensors which are commercially available at present, angle increments of a half degree can be implemented. Two hundred digital pulses per second can be made available for control.

The area 20 should extend in angular terms between 90° and 130°, and even angles up to 180° in the configuration of the Hall sensors would be possible. In practice such large pivoting angles between the tractor and trailer do not occur and could no longer be managed in the vicinity of 180° when starting off.

In a geometrical configuration with 0.5° increments, inaccuracies which could occur when the vertical geometrical axis of the kingpin does not agree with that of the receiving opening 11 of the fifth wheel 10 can be easily compensated.

The same applies to the second embodiment of the inventions which is shown schematically in FIG. 3. The vertical geometrical axis of the drawbar 32 corresponds to the vertical axis 31. The radius of the Hall configuration 20 is selected such that it encloses the drawbar holder on the trailer vehicle with a small radial distance.

In the third embodiment of the invention there are two Hall sensors at the corresponding locations, and they act on a common evaluation circuit and indicate the detected angles.

The invention claimed is:

1. Control device for a tractor having a longitudinal geometrical center axis and a system for detecting pivoting or articulating angles between the longitudinal geometrical center axis of the tractor and a longitudinal geometrical center axis of a semitrailer coupled by way of a kingpin when the semitrailer is being coupled and being pulled into and out of parking places, the semitrailer having an underside, characterized by a configuration (20) of a plurality of Hall sensors (21) located next to each other in an area which encloses a receiving opening (11) of the tractor for a fifth-wheel kingpin concentrically on a partial circular arc around the vertical geometrical center axis of the receiving opening;

by at least one permanent magnet (30) which is located on the underside of the semitrailer at a radial distance ($r_m$) from the geometrical vertical axis (13) of the kingpin and with a distance to the Hall sensors such that with its magnetic field the at least one permanent magnet acts on and excites only the most closely adjacent Hall sensor of the configuration, and by electrical output lines of the Hall sensors (21), which lines are connected to an evaluation circuit that determines from the location of the excited Hall sensor an angle α between the longitudinal geometrical center axis of the tractor and the longitudinal geometrical center axis of the semitrailer.

2. Control device for a tractor having a longitudinal geometrical center axis and a system for detecting pivoting or articulating angles between a longitudinal geometrical center axis of a drawbar having a vertical geometrical pivoting axis (13) and a longitudinal geometrical center axis of a trailer coupleable by way of the drawbar when the trailer is being coupled and pulled into and out of parking places, the trailer having an underside, characterized by a configuration (20) of a plurality of Hall sensors (21) located next to each other in an area which concentrically encloses the vertical geometrical pivoting axis of the drawbar;

by at least one permanent magnet (30) which is located on the underside of the trailer at a radial distance $r_m$ from the vertical geometrical pivoting axis (31) and with a distance to the Hall sensors such that with its magnetic field the at least one permanent magnet acts on and excites only the most closely adjacent Hall sensor of the configuration, and by electrical output lines of the Hall sensors (21), which lines are connected to an evaluation circuit that determines from the location of the excited Hall sensor an angle α between the longitudinal geometrical center axis of the drawbar and the longitudinal geometrical center axis of the trailer.

3. The device as claimed in claim 1, wherein the evaluation circuit supplies the angle and/or angles to a remote control unit for an unmanned tractor as an input quantity or as input quantities.

4. The device as claimed in claim 2, wherein the evaluation circuit supplies the angle and/or angles to a remote control unit for an unmanned tractor as an input quantity or as input quantities.

* * * * *